US012695006B2

(12) United States Patent
Koolen et al.

(10) Patent No.: US 12,695,006 B2
(45) Date of Patent: Jul. 28, 2026

(54) CHARGING CABLE FOR AN ELECTRIC VEHICLE WITH COMMUNICATION CAPABILITY

(71) Applicant: ABB E-MOBILITY B.V., Delft (NL)

(72) Inventors: Gertjan Koolen, Eindhoven (NL); Cristoforo La Rosa, Toscana (IT); Lars Bech, Schiedam (NL); Miguel Rodriguez Escude, Schiedam (NL); Jim van-der-Heijden, Eindhoven (NL); Stefan Raaijmakers, Delft (NL)

(73) Assignee: ABB E-Mobility B.V., Delft (NL)

( * ) Notice: Subject to any disclaimer, the term of this patent is extended or adjusted under 35 U.S.C. 154(b) by 757 days.

(21) Appl. No.: 17/890,402

(22) Filed: Aug. 18, 2022

(65) Prior Publication Data

US 2023/0059240 A1     Feb. 23, 2023

(51) Int. Cl.
H01B 9/00        (2006.01)
B60L 53/18        (2019.01)
B60L 53/30        (2019.01)

(52) U.S. Cl.
CPC .............. H01B 9/003 (2013.01); B60L 53/18 (2019.02); B60L 53/305 (2019.02)

(58) Field of Classification Search
CPC ........ H01B 9/003; B60L 53/305; B60L 53/18
USPC ........................................................ 320/109
See application file for complete search history.

(56) References Cited

U.S. PATENT DOCUMENTS

| | | | | |
|---|---|---|---|---|
| 2012/0112697 A1* | 5/2012 | Heuer | .................... | B60L 53/60 |
| | | | | 320/109 |
| 2012/0166269 A1* | 6/2012 | Payne | .................. | G07F 15/005 |
| | | | | 903/902 |
| 2015/0065039 A1* | 3/2015 | Nii | .......................... | H01F 38/14 |
| | | | | 455/41.1 |
| 2017/0197519 A1* | 7/2017 | Jeong | ...................... | B60L 53/11 |
| 2018/0334047 A1 | 11/2018 | Wischnack et al. | | |
| 2019/0165591 A1* | 5/2019 | Kisacikoglu | ........... | B60L 53/20 |
| 2021/0385095 A1* | 12/2021 | Raaijmakers | .......... | B60L 53/66 |

FOREIGN PATENT DOCUMENTS

| | | | |
|---|---|---|---|
| EP | 3388277 A1 | 10/2018 | |
| EP | 3744562 A1 | 12/2020 | |
| KR | 10-2013-0107739 A | 10/2013 | |
| KR | 10-2017-0091385 A | 8/2017 | |
| WO | WO 2017/010750 A1 | 1/2017 | |

OTHER PUBLICATIONS

European Patent Office, Extended European Search Report in European Patent Application No. 21192051.7, 11 pp. (Feb. 7, 2022).
"Electromagnetic Interference and Anti-interference Technology of Single-Chip Microcomputer Application System," edited by Wang Xingzhi et al., Beijing: Beihang University Press, p. 143, Feb. 2006.
Office Action issued in Chinese Application No. 202210992597.7, dated Mar. 7, 2025.

* cited by examiner

*Primary Examiner* — Suchin Parihar
(74) *Attorney, Agent, or Firm* — McCarter & English, LLP; Michael M. Gnibus

(57)        ABSTRACT

A charging cable for an electric vehicle includes at least two power lines configured for conducting a charging current, and two high-frequency communication lines being separate and extending in parallel to the power lines and configured for transmitting a charging information between a charger and an electric vehicle.

14 Claims, 2 Drawing Sheets

-PRIOR ART-

CHARGING CABLE FOR AN ELECTRIC VEHICLE WITH COMMUNICATION CAPABILITY

CROSS-REFERENCE TO RELATED APPLICATIONS

This patent application claims priority to European Patent Application No. 21192051.7, filed on Aug. 19, 2021, which is incorporated herein in its entirety by reference.

FIELD OF THE DISCLOSURE

The present disclosure relates to a charging cable for an electric vehicle and, more generally, a charging cable for power supply equipment for an electric vehicle.

BACKGROUND OF THE INVENTION

Charging cables for electric vehicles comprise several conductors or conducting lines. Some of these conductors are used for transmitting charging current between a charger and an electric vehicle; they are called power lines. Some conductors are used for transmitting or exchanging a charging information between the charger and the electric vehicle. In at least some charging cables, at least one of the power lines is also used for exchanging the charging information. In at least some cases, exchanging the charging information charger may not work correctly, particularly for longer charging cables. This may result in a malfunctioning and/or the cars may even fail to charge.

BRIEF SUMMARY OF THE INVENTION

In one general aspect, the present disclosure describes a charging cable for an electric vehicle with improved communication capabilities. An aspect relates to a charging cable for an electric vehicle. The charging cable comprises at least two power lines and two high-frequency communication lines. The power lines are configured for transmitting a charging current from a charger to an electric vehicle. The communication lines are configured for exchanging a charging information between the charger and the electric vehicle, wherein the communication lines are separated from the power lines and extend in parallel to the power lines, for example electrically separated.

The power lines may be used for transmitting the charging current for charging the electric vehicle. The ground conductor and/or power conductors may comprise an arbitrary conducting material. For instance, the ground line and/or the power line may comprise copper and/or aluminum or may consist of these materials. The wires may be designed as wire strands and/or braids. Usage of aluminum instead of copper conductors may result in cost reduction and/or weight reduction of the cables.

The high-frequency communication lines extending between the charger and the electric vehicle exchanges the charging information, by using bidirectional communication between the electrical vehicle (EV) and the charger (EV charger, or EVSE: EV supply equipment). The communication between the EV and the EVSE may use, e.g., PWM (pulse-width modulation) and/or PLC (power line communication) signals. The charging information may, for instance, comprise information about a type of the electric vehicle to be charged and/or its battery, a battery's charging state, a time remaining until charging being accomplished, an information about a driving distance with a current load of charge, state of the battery usage, an amount of recharges remaining until the battery exchange is required, and/or further information related to the changing process. Furthermore, the charging information may include commands sent between the electric vehicle and the charger. Those commands may, for instance, include initialization sequences, e.g. for detecting the electric vehicle at the charger at a begin and/or at an end of the charging process. Therefore, a correct transmission of the charging information between the electric vehicle and the charger may be essential for conducting the charging process correctly.

For exchanging the charging information between the electric vehicle and the charger, high-frequency signals or RF signals (RF: radio frequency), e.g. of 1 MHz and/or above, may be used. The high-frequency communication lines are separated from the power lines and extend in parallel to them and, thus, their impedance can be designed or optimized to match the impedances of the devices they connect. For example, in one embodiment the high-frequency communication lines can be electrically separated from the power lines with a help of a dielectric layering. For instance, the impedances of the communication lines can be designed to match the impedances of the charger's communication part and/or the electric vehicle's communication part, which may have impedances of 50 ohms, because impedances of this range are often used for RF (radio frequency) transmission.

BRIEF DESCRIPTION OF THE SEVERAL VIEWS OF THE DRAWING(S)

DETAILED DESCRIPTION OF THE INVENTION

Figure 1:
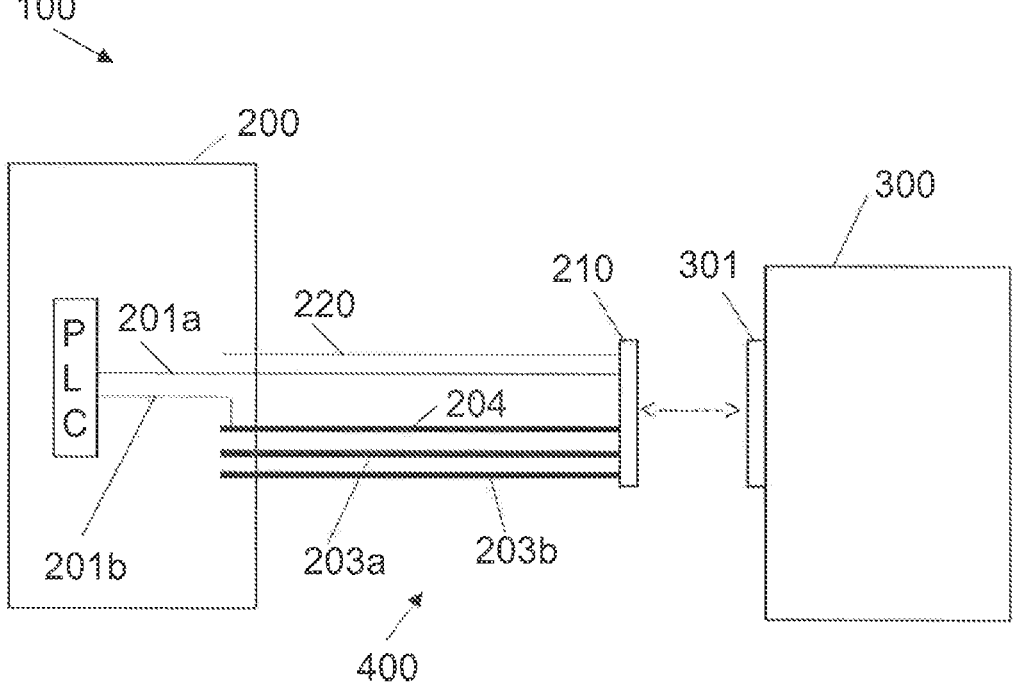
FIG. 1 is a schematic view an electric vehicle supply equipment for charging an electric vehicle according to state of the art.

FIG. 1 schematically shows an electric vehicle supply equipment, EVSE, 100 for charging an electric vehicle 300 according to state of the art. The electric vehicle supply equipment 100 comprises a charger 200 configured for supplying a charging current. Furthermore, the EVSE comprises a charging cable 400, which is connected with one end to the charger 200 and with its opposite end to a charging connector 210. The charging connector 210 is configured for being plugged into a respective charging socket 301 of the electric vehicle 300, for charging the electric vehicle with electrical energy.

The charging cable 400 comprises two power lines 203a, 203b configured for conducting charging current. The charging cable 400 further comprises a Protected Earth, PE, line 204. For exchanging communication information between the charger 200 and the electric vehicle 300, communication lines 201a, 201b are used. It is clearly visible that the embodiment of FIG. 1 "re-uses" at least one line, i.e. the PE line 204, for the communication—i.e. for exchanging communication information—between the charger 200 and the electric vehicle 300. So, the PE line 204 of FIG. 1 has two functions: safety and signal return wire for PLC (power-line communication). This may lead to a mismatch of the impedance of communication lines 201a, 201b, 204 and the communication part PLC of the charger 200. This may, further, lead to a mismatch of the impedance of communication lines 201a, 201b and the communication part of the electric vehicle 300. Said impedance mismatch(es) may lead to significant loss of quality of the charging information transmission, particularly for charging cables that extend over several meters. This effect may be visible with a cable length of 5 meters, but may be especially problematic for longer cables, e.g. of 10 meters.

Figure 2:
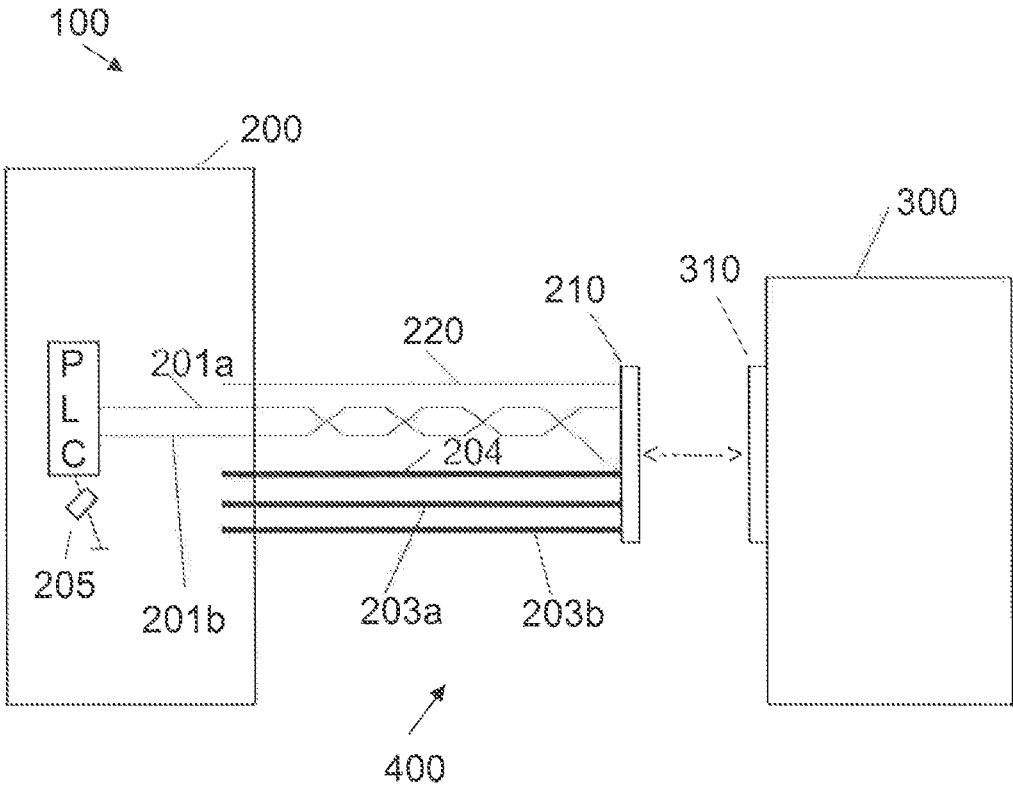
FIG. 2 is a schematic view an electric vehicle supply equipment for charging an electric vehicle in accordance with the disclosure.

FIG. 2 schematically shows an electric vehicle supply equipment, EVSE, 100 for charging the electric vehicle 300 according to an embodiment. Unlike the state-of-the-art solution shown in FIG. 1, the high-frequency communication lines 201a, 201b are separated from the power lines 203a, 203b and extend in parallel to the power lines 203a, 203b. For example, the high-frequency communication lines 201a, 201b are electrically separated from the power lines 203a, 203b, for example with a dielectric. Particularly, the communication lines 201a, 201b are separated from the PE line 204, except at its end—i.e. in the charging connector 210 or close to the charging connector 210—, where the PE line 204 is connected to a ground line 201b of the communication lines. In the embodiment of FIG. 2, the PE line 204, which has a safety function, is not used for communication.

In the embodiment shown, the communication lines 201a, 201b are designed as a twisted pair line. Additionally or as an alternative, the high-frequency communication lines 201a, 201b may be implemented as a coaxial cable. The communication lines comprise the communication ground line 201b and the CP line 201a. This separation of communication lines 201a, 201b from the power lines 203a, 203b allows a better impedance adaption of the communication lines 201a, 201b to the impedances of the charger's communication part and the EV's communication part. Furthermore, it may contribute to reducing effects of electromagnetic interference and cross-talking. The PE line 204 and the communication ground line lines 201b are connected at the charging connector 301, e.g. for safety reasons.

By providing the at least one twisted-pair line 201a, 201b between the charging connector 210 respectively and the charger 200, the length of the charging cable 400 can be more than 5 meters, and may, for example, extend up to 40 meters in case 1000BASE-T1 standard, with low quality loss, or even without worsening the communication quality between the charging connector 210 and the charger 200. The advantages of the charging cable 400 due to better impedance adaption, but also a higher electromagnetic compatibility, and/or with respect to noise originating from electromagnetic interference, EMI, may contribute to this improvement.

The embodiment of FIG. 2 may, optionally, comprise a ferrite bead and/or an inductance 205, which is arranged between the ground line 201b of the high-frequency communication lines 201a, 201b and a ground line of the charger 200. Additionally or as an alternative, an embodiment may comprise a (further) ferrite bead and/or an inductance inside the connector 210 (ferrite bead not shown), which is arranged between the ground line 201b of the high-frequency communication lines 201a, 201b and a ground line of the charger 200.

This impedance matching is highly advantageous, compared to at least some conventional charging cables, which may "re-use" at least one of the power lines for communication purposes. The "re-used" power lines may have quite different impedances, thus leading to a mismatch of the impedances, which in turn may cause electrical reflections in the "re-used" communication lines, then leading to attenuation and/or disturbances in the "re-used" lines. This effect may be particularly problematic for long charging cables, i.e. charging cables extending over, e.g., more than 2 meters, more than 5 meters, or more than 10 meters. Said effect may result in some deficiency or even in a failure of charging. In contrast, the charging cables described above and/or below may be able to exchange the charging information correctly over a cable length of 5 meters, of 10 meters, of 20 meters, particularly up to 40 meters. The charging cable described above and/or below solves said communication issues by splitting the power lines from the high-frequency communication lines, thus being able to optimize the behavior of both of them and, particularly, to improve the communication between the electric vehicle and the charger. Moreover, this charging cable is compatible with existing chargers and electric vehicle, because the connection both to the charger and to the electric vehicle—via the same charging connector type—stays the same, but with improved communication capabilities between the charger and the electric vehicle.

In various embodiments, the charging information between the charger and the electric vehicle is exchanged according to a Combined Charging System (CCS) protocol.

The CCS protocol supports a fast-charging method for charging electric vehicles, by delivering high-voltage current via a charging connector, e.g. a connector fulfilling and/or being derived from a SAE J1772/IEC 62196 Type 1 or IEC 62196 Type 2 connector specifications. The CCS may allow AC and DC charging. The charging cable described above and/or below may—additionally or as an alternative—also support other protocols such as CHAdeMO (CHArge de Move) and/or GB/T (Guobiao), e.g. according to GB/T 20234.3-2011 standard.

The Control Pilot, CP, line is one of the electric lines of the CCS protocol, which may be used for exchanging charging information between the charger and the electric vehicle, e.g. via an analogue signal. For example, the CP line may be responsible for exchanging (receiving/transmitting) additional safety features, e.g. for a verification that the vehicle is connected correctly, for an integrity check of the ground conductor, for a determination of cooling requirements of charging area, for an adjustment of the real-time available load current, and/or for other purposes. The CP line may be used to exchange other information between the electric vehicle and the charger. Furthermore, the CP line may be used by an electric vehicle and/or the charger to initiate charging. The CP line may carry signals in a broad range of frequencies. In at least some implementations, the CP line may contain two types of signals to implement the above functions, for instance 0.. 2 MHz for the PWM as specified by IEC61851-23, and/or 2.. . 30 MHz for the PLC communication as specified by ISO15118-3.

According to an embodiment, the charging information is exchanged via a pulse-width-modulation, PWM, signal. In at least some cases, PWM may preferably be used for simple information sharing. PWM may preferably use a frequency range between 0 Hz and 3 MHz. For instance, the frequencies may be in a range of 0 Hz to 2 MHz, i.e. including DC (0 Hz). Principally, the PWM may have indefinite bandwidth, but practically harmonics up to 2 MHz may be the most relevant range, e.g. due to a requirement of $2_{\mu s}$ rise and fall times as specified by IEC61851-1.

Additionally or as an alternative, the charging information is transmitted at a frequency between 1 MHz and 50 MHz, particularly between 2 MHz and 30 MHz. For bidirectional information sharing between the charger and the electric vehicle at these frequencies, Power-Line communication, PLC, may be applied. The PLC line may support the requirements of PLC line quality according to ISO15118-3

Annex A.11, which specifies that all frequencies in the 2-30 MHz band must have a tolerance of ±3 dB.

In various embodiments, the at least two power lines are configured for DC charging current and/or for AC charging current. The AC may require additionally transforming to the DC before being stored in the electric vehicle's battery. This may be achieved by plugging a transformer and/or a converter for connecting to respectively receiving electric energy from an AC grid, which is transformed and/or converted to DC for being supplied via the charging cable to the electric vehicle connected thereto via the charging connector.

In various embodiments, the at least two power lines further comprise a Protected Earth, PE, line. The PE line is connected to a ground line of the communication lines.

The PE line may be used for safety purposes. The PE line may be connected to the ground line of the communication line, e.g. for safety purposes. This, further, may advantageously improve communication between the electric vehicle and the charger.

In various embodiments, the high-frequency communication lines are implemented as a twisted pair line. The twisted pair line is a type of wiring in which two conductors of a single circuit are twisted together. This may effect in a reduction of the line impedance in order to improve the tolerance of the signal amplitudes over the mentioned frequency range. It turned out that, in a plurality of cases, the lowered line impedance matches better with the source and end termination resistances, which are usually son. Furthermore, the twisted pair line may contribute to improve electromagnetic compatibility. Compared to a single conductor or an untwisted balanced pair, a twisted pair may reduce electromagnetic radiation from the pair and cross-talk between neighboring pairs and may improve the rejection of external electromagnetic interference. Therefore, implementing high-frequency communication lines as a twisted pair may advantageously improve the transmission of the charging information between the electric vehicle and the charger. The term twisted pair should be broadly interpreted such that the wires do not mandatorily have to be twisted across their full length, or they may be designed as shielded twisted pair (STP) or unshielded twisted pair (UTP).

Additionally or as an alternative, the high-frequency communication lines may be implemented as a coaxial cable. In an ideal coaxial cable, the electromagnetic field carrying the signal exists only in the space between the inner and outer conductors, thus preventing both emission and/or immission of electric signals, i.e. to protect the signal from external electromagnetic interference. Therefore, implementing high-frequency communication lines as a coaxial cable may advantageously improve the transmission quality of the charging information between the electric vehicle and the charger.

The charging cable described above and/or below may be applicable for both car charge cable systems and for pantograph systems. In a pantograph system, the charging connector may be a pantograph or a hood. The pantograph solution may be particularly advantageous for charging larger electric vehicles, for example, electric buses or ferries. Exemplarily, a bus pantograph solution equipped with a roof-mounted pantograph, which represents an advantageously robust design, may be provided. It allows charging larger fleets of electric buses overnight. Alternatively, in the pantograph system, the CP line may be twisted around the PE conductor.

In some embodiments, the charging cable for the electric vehicle may further comprise further lines, wherein the further lines are configured for exchanging Proximity Pilot, PP, information, temperature information, and/or any other signal lines. The PP line may have some limited specified function, but may also, e.g., be used for sensing various parameters such as temperature, humidity, light, acceleration, electrical resistance, etc., either in the charging connector or in the charging cable.

In various embodiments, the power lines and the high-frequency communication lines and, optionally, the further lines are arranged within the same cable cover. This may advantageously lead to a compact and/or user-friendly design of the charging cable. This may further support a high compatibility with existing systems, particularly because the cable may, thus, may look very similar to existing cables, and it can be connected to an existing charger and/or to an existing charging connector.

The cable cover may comprise additional shielding. Therefore, it may prevent a cross-talk and an electromagnetic interference between charging cables when several electric vehicles are charged simultaneously at neighboring charging stations.

An aspect relates to an electric vehicle power supply equipment (EVSE) for an electric vehicle. The EVSE comprises a charger configured for charging the electric vehicle, a charging connector configured for mating a charging socket of an electric vehicle, and a charging cable as described above and/or below. The charging cable is arranged between the charger and the connector and configured for transmitting a charging current to the electric vehicle and for exchange charging information between the charger and the electric vehicle.

The charging cable may be used as a part of the EVSE. Sometimes, the EVSE may also be called an electric vehicle charging station, an electric recharging point, a charging point, a charge point, a charge post, or an electronic charging station. The EVSE may be an element in an infrastructure that supplies electric energy for the recharging of electric vehicles, including electric cars, neighborhood electric vehicles and plug-in hybrids. EVSEs may comply with electric vehicle fast-charging standards, such as the so-called Combined Charging System, CCS, protocol according to IEC 61851-23 and SAE J1772 standard for charging electric vehicles both in the US and in the European Union, EU. The EVSE may comprise a transformer and/or a converter for connecting to respectively receiving electrical energy from an AC grid, which is transformed and/or converted to DC for being supplied via the charging cable to the electric vehicle connected thereto via the charging connector.

In various embodiments, a Protected Earth, PE, line is connected to a ground line of the communication lines, in the charging connector or close to the connector. The PE line may advantageously enhance the charging cable's electric safety.

In various embodiments, the EVSE further comprises a ferrite bead, a ferrite clamp, or an inductance arranged between the ground line of the high-frequency communication lines and a ground line of the charger, i.e. in the internal grounding of the PLC module in the charger. This arranging of the ferrite bead may advantageously further reduce the influence of the PE line impedance on the PLC communication properties of the high-frequency communication lines. In particular, it may improve impedance matching at the charger and the electric vehicle endpoints. Implementing the ferrite bead may be considered similar to the implementation of a low-pass filter. Alternatively, an inductance may be used as low-pass filter instead of a ferrite bead. The low-pass filter may be preferably provided at the charger. Alternatively or in addition, the low-pass filter may be provided within the charging connector and/or completely encased by an enclosure and/or casing of the charging connector. The location of this may be in the PE line, inside the connector, while the communication ground line does not go through the ferrite bead.

In various embodiments, the EVSE further comprises a ferrite bead or an inductance inside the connector, which is arranged between the ground line of the high-frequency communication lines and a ground line of the charger. This ferrite bead may be arranged in the EVSE additionally or as an alternative to the ferrite bead as described above.

In various embodiments, the electric vehicle power supply comprises the connector according to IEC 61851-23, DIN SPEC 70121 (e.g. DIN SPEC 70121:2014), ISO/IEC 15118-2 (e.g. ISO/IEC 15118-2:2014 ED1), ISO/IEC 15118-3 (e.g. ISO/IEC 15118-3:2015 ED1), and/or SAE J1772 specifications.

An aspect relates to a use of the charging cable as described above and/or below, and/or a use of the electric vehicle power supply equipment as described above and/or below for charging an electric vehicle.

For further clarification, the invention is described by means of embodiments shown in the figures. These embodiments are to be considered as examples only, but not as limiting.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A charging cable for an electric vehicle, comprising:
at least two power lines configured for conducting a charging current, and two high-frequency communication lines configured for exchanging a charging information between a charger and an electric vehicle;
wherein the high-frequency communication lines are separated from the power lines and extend in parallel to the power lines along the charging cable; and
wherein a ferrite bead or inductance is arranged between a ground line of the high-frequency communication lines and a ground line of the charger.

2. The charging cable of claim 1, wherein the charging information is exchanged according to a Combined Charging System (CCS) protocol.

3. The charging cable of claim 1, wherein the charging information is exchanged by means of a pulse-width modulation (PWM).

4. The charging cable of claim 1, wherein the charging information is exchanged at a frequency between 1 MHz and 50 MHz.

5. The charging cable of claim 1, wherein the at least two power lines are configured for a DC charging current and/or for an AC charging current.

6. The charging cable of claim 1, wherein the at least two power lines further comprise a Protected Earth (PE) line, and wherein the PE line is connected to the ground line of the communication lines.

7. The charging cable of claim 1, wherein the high-frequency communication lines are implemented as a twisted pair line.

8. The charging cable of claim 1, wherein the high-frequency communication lines are implemented as a coaxial cable.

9. The charging cable of claim 1, further comprising further lines, the further lines configured for exchanging Proximity Pilot (PP) information, and/or temperature information, communication signals and/or any other signals.

10. The charging cable of claim 1, wherein the charging cable further comprises a cable cover, and wherein the power lines and the high-frequency communication lines are arranged within the cable cover.

11. The electric vehicle power supply equipment of claim 10, wherein the connector is a connector according to IEC 61851-23, DIN SPEC 70121, ISO/IEC 15118-2, ISO/IEC 15118-3 and/or SAE J1772 specifications.

12. An electric vehicle power supply equipment for charging an electric vehicle, comprising:
a charger configured for charging the electric vehicle;
a charging connector, the charging connector configured for mating a charging socket of the electric vehicle;
a ferrite bead or inductance; and
a charging cable extending between the charger and the charging connector, the charging cable comprising:
at least two power lines configured for conducting a charging current from the charger to the electric vehicle, and two high-frequency communication lines configured for exchanging a charging information between the charger and the electric vehicle;

wherein the high-frequency communication lines are separated from the power lines and extend in parallel to the power lines along the charging cable; and wherein the ferrite bead or inductance are arranged between a ground line of the high- frequency communication lines and a ground line of the charger.

13. The electric vehicle power supply equipment of claim 12, further comprising a Protected Earth (PE) line, wherein the PE line is connected to the ground line of the communication lines, in the connector or close to the connector.

14. The electric vehicle power supply equipment of claim 12, further comprising a ferrite bead or inductance inside the connector, which is arranged between the ground line of the high-frequency communication lines and the ground line of the charger.

\* \* \* \* \*